United States Patent
Baessler et al.

(10) Patent No.: US 8,543,571 B2
(45) Date of Patent: Sep. 24, 2013

(54) ENHANCED CONTENT WEB BROWSING

(75) Inventors: Michael Baessler, Neckartenzlingen (DE); Andrea Elias, Boeblingen (DE); Thilo Goetz, Tuebingen (DE); Thomas Hampp-Bahnmueller, Stuttgart (DE); Sebastian Nelke, Schonaich (DE)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/350,498

(22) Filed: Jan. 8, 2009

(65) Prior Publication Data
US 2010/0174713 A1 Jul. 8, 2010

(51) Int. Cl.
*G06F 17/00* (2006.01)

(52) U.S. Cl.
USPC .......................................... 707/726

(58) Field of Classification Search
USPC .................................. 707/726, 736, 999.002
See application file for complete search history.

(56) References Cited

U.S. PATENT DOCUMENTS

| | | | |
|---|---|---|---|
| 6,128,635 A | 10/2000 | Ikeno | |
| 6,970,870 B2 | 11/2005 | Dweck et al. | |
| 7,003,522 B1 | 2/2006 | Reynar et al. | |
| 7,047,502 B2 * | 5/2006 | Petropoulos et al. | 715/781 |
| 7,747,611 B1 * | 6/2010 | Milic-Frayling et al. | 707/722 |
| 7,844,891 B2 * | 11/2010 | Chandra | 715/208 |
| 2004/0001099 A1 | 1/2004 | Reynar et al. | |
| 2004/0205558 A1 * | 10/2004 | Holloway et al. | 715/513 |
| 2004/0268237 A1 | 12/2004 | Jones et al. | |
| 2006/0020882 A1 | 1/2006 | Beezer et al. | |
| 2006/0143568 A1 * | 6/2006 | Milener et al. | 715/738 |
| 2006/0247983 A1 | 11/2006 | Dalli | |
| 2007/0124208 A1 | 5/2007 | Schachter et al. | |
| 2007/0174247 A1 | 7/2007 | Xu et al. | |
| 2007/0271498 A1 | 11/2007 | Schachter | |
| 2008/0072145 A1 * | 3/2008 | Blanchard et al. | 715/273 |
| 2008/0109881 A1 | 5/2008 | Dasdan | |
| 2008/0184138 A1 * | 7/2008 | Krzanowski et al. | 715/760 |
| 2009/0049373 A1 | 2/2009 | Sharma et al. | |
| 2009/0132481 A1 * | 5/2009 | Toub et al. | 707/3 |

OTHER PUBLICATIONS

U.S. Appl. No. 12/475,550, filed May 31, 2009.
Non-Final Office Action dated Aug. 3, 2011, for U.S. Appl. No. 12/475,550 filed May 31, 2009; 27 pages.

* cited by examiner

*Primary Examiner* — Mohammed R Uddin
(74) *Attorney, Agent, or Firm* — Cantor Colburn LLP; Joseph Polimeni

(57) ABSTRACT

An embodiment of a method for enhanced content browsing includes loading a web page in a user interface; detecting entities of a first specified type in the web page by an analysis service; tagging the detected entities in the web page; calling an action service associated with the analysis service when a detected entity is activated; and displaying a result of the action service in the user interface. Embodiments of systems for enhanced content browsing are also provided.

22 Claims, 7 Drawing Sheets

IBM

Home  Solutions  Services  Products  Support and Downloads  My IBM

Employee Directory

Search Results

The following employee(s) were found:

Frank Nelke
Email: frank.nelke@de.ibm.com
Telephone: 49-522-526-4518
Location: Hanover, Germany

601

Sebastian Nelke
Email: snelke@de.ibm.com
Telephone: 49-70⋯
Location: Boeblin⋯

602

Add to Lotus Notes contacts
Create new business partner in SAP CRM

Email this page   Print this page   Digg this   Save to del.ico.us
About IBM   Privacy   Contact   Terms of Use   IBM feeds

FIG. 6

ENHANCED CONTENT WEB BROWSING

BACKGROUND

This disclosure relates generally to the field of enhanced web browsing, and more specifically offering actions to a user based on content analysis of electronic documents.

In the course of browsing web pages on the Internet, a user may with to perform an action, such as retrieving additional information regarding a term or terms encountered in a web page or electronic document. Performing the action may require opening an additional web browser and executing a search; this may be distracting for the user. Smart tags are a solution that has been proposed to provide additional actions in conjunction with terms in a web page. However, use of smart tags may significantly slow the loading of a web page.

There exists a need in the art for user-configurable systems and methods for provision additional actions regarding web content to a user without distracting the user or slowing web page load times.

BRIEF SUMMARY

An exemplary embodiment of a method for enhanced content browsing includes: loading a web page in a user interface; detecting entities of a first specified type in the web page by an analysis service; tagging the detected entities in the web page; calling an action service associated with the analysis service when a detected entity is activated; and displaying a result of the action service in the user interface.

An exemplary embodiment of a computer program product comprising a computer readable storage medium containing computer code that, when executed by a computer, implements a method for enhanced content browsing that includes loading a web page in a user interface; detecting entities of a first specified type in the web page by an analysis service; tagging the detected entities in the web page; calling an action service associated with the analysis service when a detected entity is activated; and displaying a result of the action service in the user interface.

An exemplary embodiment of a system for enhanced content browsing system includes a user interface configured to display a web page; a service integration layer in communication with the user interface; an analysis service in communication with the service integration layer, the analysis service configured to detect entities of a first specified type; and an action service in communication with the service integration layer, the action service being associated with the analysis service, the action service configured to perform a specified action regarding a detected entity when the detected entity is activated.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 4 shows an embodiment of a web browser incorporating enhanced content browsing.

FIG. 5 shows an embodiment of a web browser incorporating enhanced content browsing.

FIG. 6 shows an embodiment of a web browser incorporating enhanced content browsing.

DETAILED DESCRIPTION

Embodiments of a system and method for enhanced content browsing are provided, with exemplary embodiments being discussed below in detail.

Enhanced Content Browsing (ECB) automatically enriches web documents by offering actions to a user based on content analysis, anticipating the needs of a user. Specific terms in a web document may be associated with actions using text analysis and semantic tags. ECB may integrate actions directed to various resources, including but not limited to IBM profiles or bluepages, Dogear, Wikipedia, Amazon, IMDB, Lotus Notes, or other electronic entity, into any web page. Information regarding business entities mentioned in a web page, such as customer names, part or order numbers, or employee information may be provided by ECB, and the business information may be automatically added to an electronic address book. A result of an action may be displayed in an action panel next to the web content in the same application or window, so that the user does not need to switch between windows or applications to complete the action, allowing the user to stay on task.

ECB may save time for a user by automatically offering an action to the user. ECB may provide deeper understanding of online content with minimal effort, providing the user with information to use as a basis for decision making. ECB is fast and unobtrusive. The user does not need to shift their focus to look up missing information, perform explicit searches, or switch to another web page to perform a desired action. ECB may perform such diverse tasks as looking up a term definition, adding a book title to a shopping cart, or checking for weather at a specified location. ECB provides an open architecture, allowing for user-defined combination of analysis services with action services. The user may configure terms that are recognized in a webpage, and the target of the action performed regarding the recognized terms.

Figure 1:
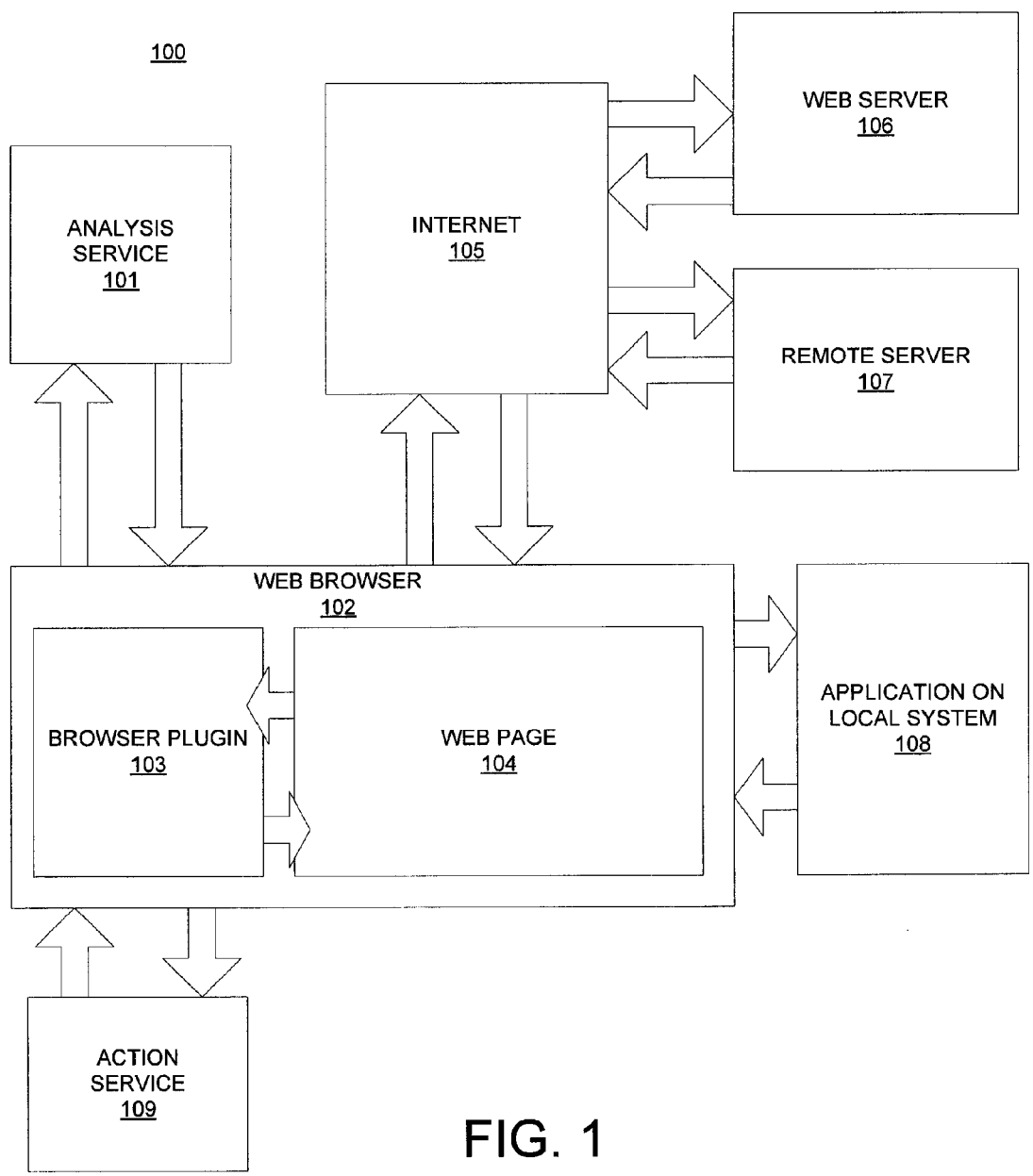
FIG. 1 illustrates an embodiment of a system for enhanced content browsing.

FIG. 1 shows an embodiment of a system for enhanced content browsing. A web page 104 is loaded in web browser 102. Browser plugin 103 passes the content of web page 104 asynchronously to analysis service 101. Analysis service 101 analyzes the content of web page 104 and recognizes entities in web page 104 of a specified type. The recognized entities are tagged in web page 104 by analysis service 101. When a recognized entity is activated in web page 104, the action service 109 associated with analysis service 101 is called by browser plugin 102. Action service 109 performs an action that is associated with the recognized entity in web page 104. The action service 109 may interact with web server 106 or remote server 105 via internet 105 to complete the action, or with an application on the local system 108. The type of action performed by action service 109 and the target of action service 109 are configurable by the user. While a single analysis service 101 and action service 109 are shown in the embodiment of FIG. 1, a system for enhanced content browsing may comprise any appropriate number of analysis services and action services.

Figure 2:
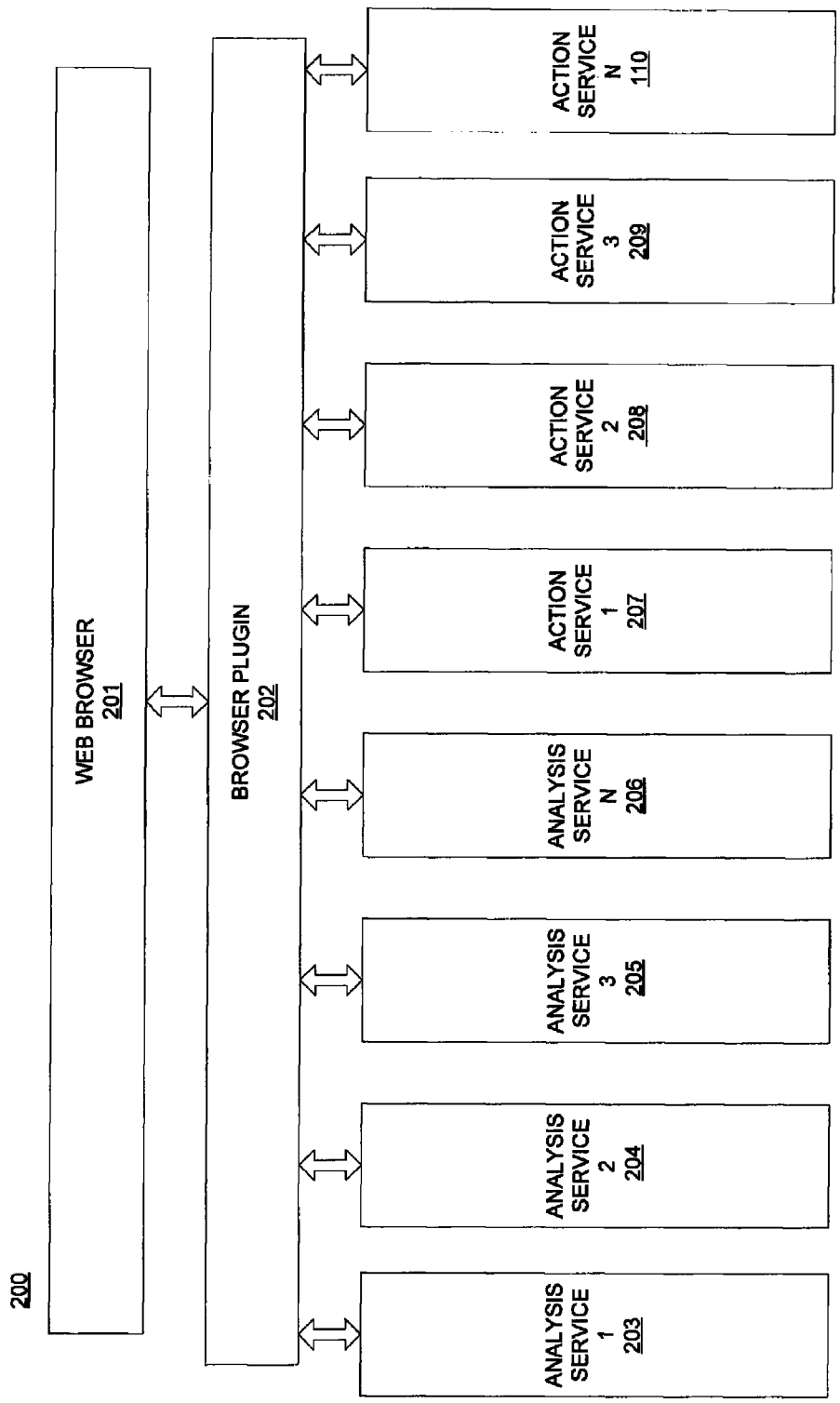
FIG. 2 illustrates an embodiment of a system for enhanced content browsing.

FIG. 2 illustrates an embodiment of a system 200 for enhanced content browsing. A user views a web page in web browser 201. Web browser 201 communicates with browser plugin, or service integration layer, 202, which passes text from the web page to a plurality of analysis services 203-206. Analysis services 203-206 parse the text and recognize entities in the web page. An entity is a term or terms of a specified type. Each analysis service may recognize a different type of entity, as configured by the user. Entities recognized by analysis services 203-206 are tagged using semantic tags. The semantic tagging returned by analysis services 203-206 is displayed in the web page in web browser 201. Tagged entities may be indicated in the analyzed web page by, for example, highlighting; a different color of highlighting may be used for each different analysis service in some embodiments. System 200 may comprise any number analysis services, as configured by the user, up to a maximum number supported by browser plugin 202.

Each analysis service 203-206 is associated with one or more action services; in the embodiment of FIG. 2, analysis service 1 (203) is associated with action service 1 (207), analysis service 2 (204) is associated with action service 2 (208), analysis service 3 (205) is associated with action service 3 (209), and analysis service N (206) is associated with action service N (210). The user may configure analysis services, action services, and associations between the two types of services. An analysis service may be directly associated with one or more action services, or an analysis service may be associated with a semantic type that is associated with one or more action services.

When a tagged entity in the web page is activated in web browser 201, the tagged entity is passed by the browser plugin 202 to any action service 207-210 that is associated with the analysis service 203-206 that tagged the entity. A tagged entity may be activated by a mouse-over event, a mouse click, a finger or pen touching a touchscreen, or other interaction with web browser 201. The action service 207-210 performs an action regarding the tagged entity; a target for each action service 207-210 may be configured by the user. The action service 207-210 then passes a result to browser plugin 202; action services 207-210 may return, for example, HTML snippets or XML. Browser plugin 202 passes the action result to web browser 201. The results of action service 207-210 may be displayed in an action panel in web browser 201. The mode of activation may be configurable; in some embodiments, the action results for all tagged entities that are currently visible in user interface 201 may be automatically displayed. Also, metadata associated with an activated entity by the analysis service may be sent to the action service; for example, if a city entity is detected, the analysis service may associate the city's zip code with the city, and send the zip code to the action service.

Web browser 202 calls analysis and action services asynchronously; because the services are called asynchronously, the services do not affect page load times. The analysis services 203-206 parse the text in the web page asynchronously and independently from the loading of the web page in web browser 201. The browser plugin 202 only calls any of action services 207-210 when an entity that has been tagged by the action service's associated analysis service is activated.

Embodiments of an ECB system may comprise as a web browser plug-in that may be installed and configured as desired by the user. Any appropriate technology may be used to implement ECB. Semantic tags may comprise, for example, Microformats (http://en.wikipedia.org/wiki/Microformats), RDF markup (http://en.wikipedia.org/wiki/Resource_Description_Framework) or any kind of ad-hoc markup used for semantic tagging. Web 2.0 technologies, for example, Ajax or a browser plug-in user interface (UI), may be used to implement ECB in an application such as a web browser. An XML protocol for ECB may be realized as a local API, a Representational State Transfer (REST), or a full-blown web service. Services may be REST-style unstructured information management architecture (UIMA) services as defined by Apache UIMA (http://incubator.apache.org/uima).

Multiple action services may be associated with a single analysis service. For example, an embodiment of ECB may comprise an analysis service that highlights city names. Multiple associated action services may provide different types of information associated with, for example, a tagged city name, such as street maps of the city, a Wikipedia article for the city, or restaurant listings for the city. Different types of information from different action services may be displayed in multiple tabs or in multiple smaller action panels. Alternately, multiple analysis services may be associated with a single action service. For example, an embodiment of ECB may comprise an analysis service that recognizes actor names, and an analysis service that recognizes directors. Both may be associated with an action service that retrieves information from Wikipedia or IMDB. Also, some analysis services may only tag entities, so that the entities are highlighted and brought to the user's attention; such an analysis service does not necessarily have an associated action service. For example, an analysis service may detect platinum-level customer names and mark them in special color in a customer service web-portal. In this case, the type of semantic tag ("platinum customer") may be sufficient information for a customer agent using the portal, and no action service may be needed. There is an m-to-n mapping relationship between analysis services and action services.

Figure 3:
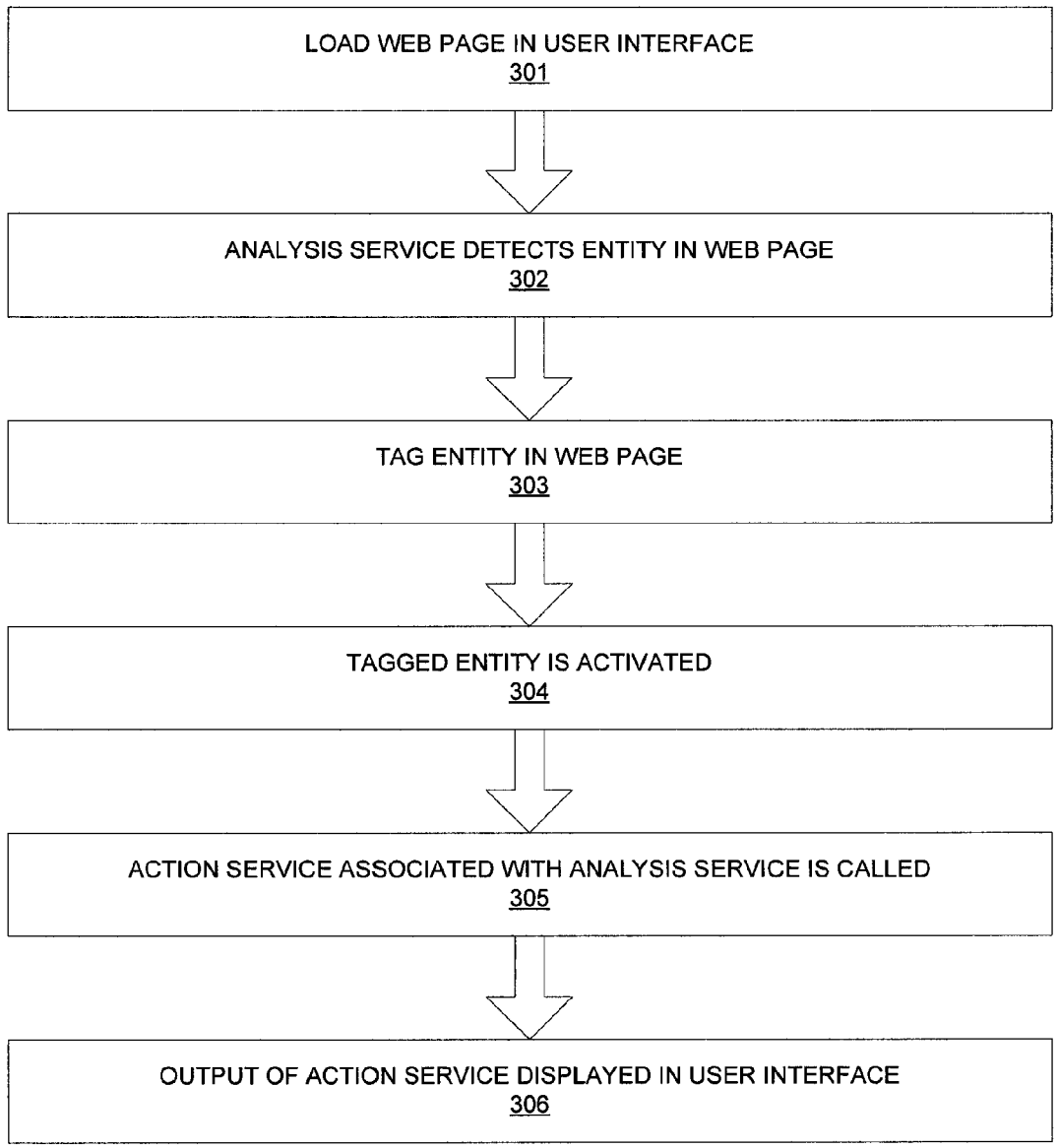
FIG. 3 illustrates an embodiment of a method for enhanced content browsing.

FIG. 3 shows an embodiment of a method 300 for ECB. A web page is loaded in a user interface block 301. The web page is analyzed asynchronously by one or more analysis services in block 302. Any entities detected by an analysis service in block 302 are tagged in the loaded web page in block 303. When a tagged entity is activated in block 304, an action service associated with the analysis service that detected the tagged entity is called in block 305. The output of the action service is displayed in the user interface in block 306.

There are many possible analysis services and associated action services, including but not limited to the following examples. An action service may be configured to interact with any appropriate target, which may be any electronic entity that is available to the user. A Wikipedia entry analysis service may detect entities for which Wikipedia entries are available; the associated action service may fetch the article summary from Wikipedia. A currency amount analysis service may detect text describing an amount of money using regular expressions; the associated action service may fetch a conversion rate to other currencies. An email address analysis service may detect email addresses using regular expressions; the associated action service may provide a mail-to action. An employee analysis service may detect mentions of names of employees of a specific company; the associated action service may fetch detailed employee information from a company database. An address analysis service may detect entities corresponding to physical addresses; the associated action service may display a map of a detected address using mapping software. An IBM abbreviations analysis service may detect IBM-specific abbreviations using internal dictionaries; the associated action service may show an expanded form of the abbreviation.

Further examples include a country analysis service that may detect mentions of country names using a dictionary-based analysis service, or a combination of a dictionary and regular expressions; the associated action service may fetch information regarding the country. A product name analysis service may detect product names for a particular company, and the associated action service may link to the company's official page describing the product. The document language analysis service may detect the language of a document, and the associated action service may link to an online translation service. A music entity analysis service may detect artists, bands, album, or song names, and the associated action service may link to a discography for the artist or band, or a link to play the detected song or album. The movie entity analysis service may detect actor, director, or movie names, and the associated action service may locate the detected names in Amazon or IMDB. A customer contact center entities analysis service may detect customer names or order numbers, which may be looked up in SAP or Siebel. An opinion analysis service may detect positive and negative opinion statements; the associated action service may provide highlighting of the detected opinion.

An action service may add a book, CD, or DVD to a shopping cart when the title of the book, CD or DVD is activated in a web page, or complete a purchase of the book, CD, or DVD. An analysis service may recognize names of newsletters, podcasts, or newsfeeds, and the associated action service may subscribe or unsubscribe to the newsletter, podcast, or newsfeed. An action service may also write an email or initiate a chat based on a person's contact information that is activated in a web page. An action service may post in a forum, write comments to a blog entry, book a flight, order food, or order posters or paper prints of digital pictures. The foregoing examples are listed for exemplary purposes; an action service may perform any available computer-based task.

Action services may perform any online task related to any online resource that is available to the user, or merely provide highlighting of entities detected by an analysis service, bringing the entity to the user's attention. Different entity types detected by different analysis services may be shown in different colors. A result of an action service may appear in an action pane adjacent to the web page on mouse over. An analysis service may be associated with any appropriate action service, as configured by the user.

Figure 4:
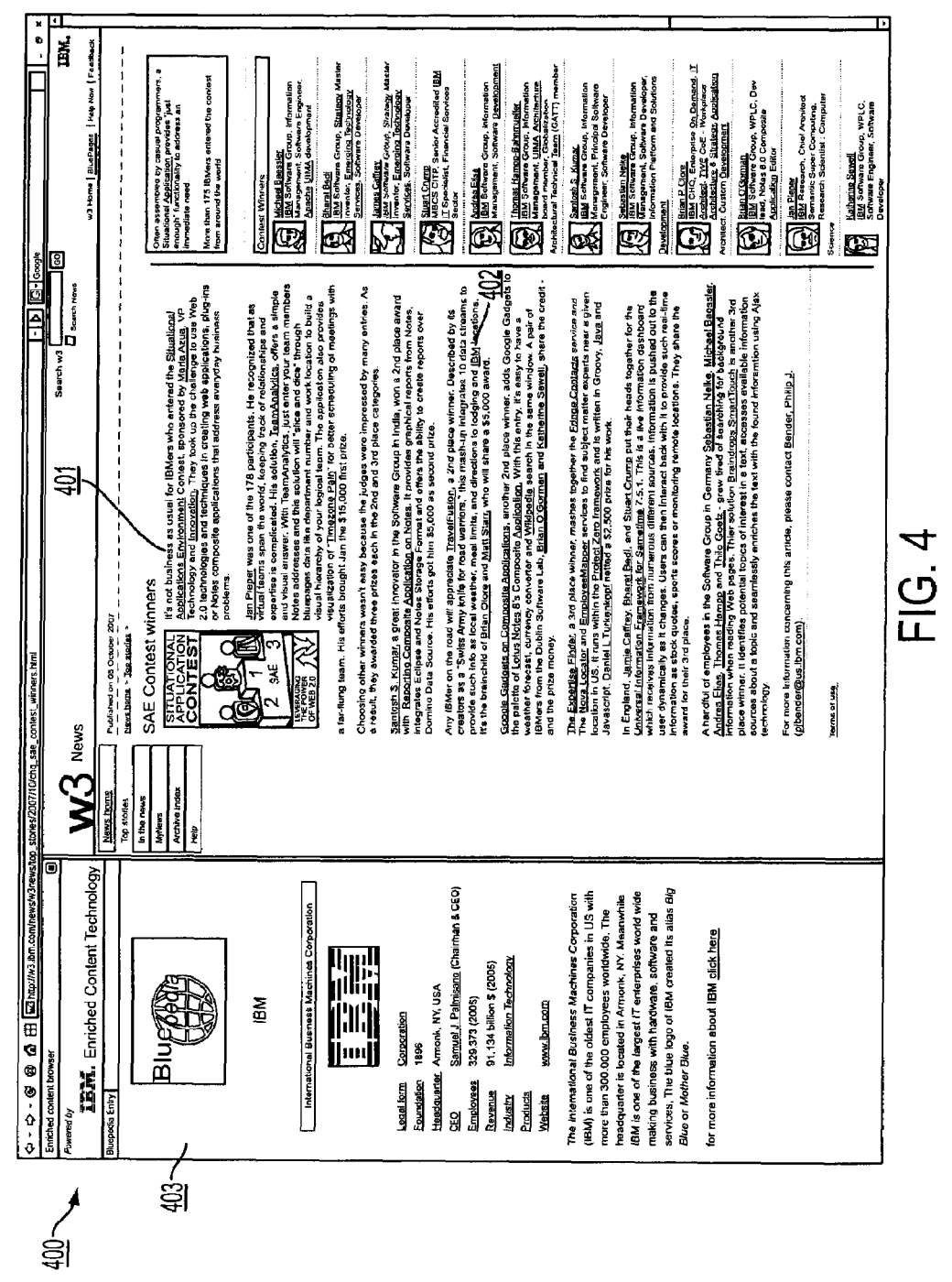

FIG. 4 shows an embodiment of a web browser 400 incorporating ECB. Web page 401 is viewed by a user in web browser 400. Highlighted terms, such as term 402 ("IBM") in web page 401, are tagged by one or more analysis services. When term 402 is activated by, for example, a mouse-over, information regarding term 402 is displayed in action panel 403 on the left-hand side of web browser 400. In this example, the information displayed in action panel 402 is retrieved from BluePedia, which is an online resource containing information about IBM. The information from BluePedia is looked up on demand when, for example, a user moves the mouse over a tagged term. At that time, the action service contacts BluePedia, retrieving the requested information on the fly.

Figure 5:
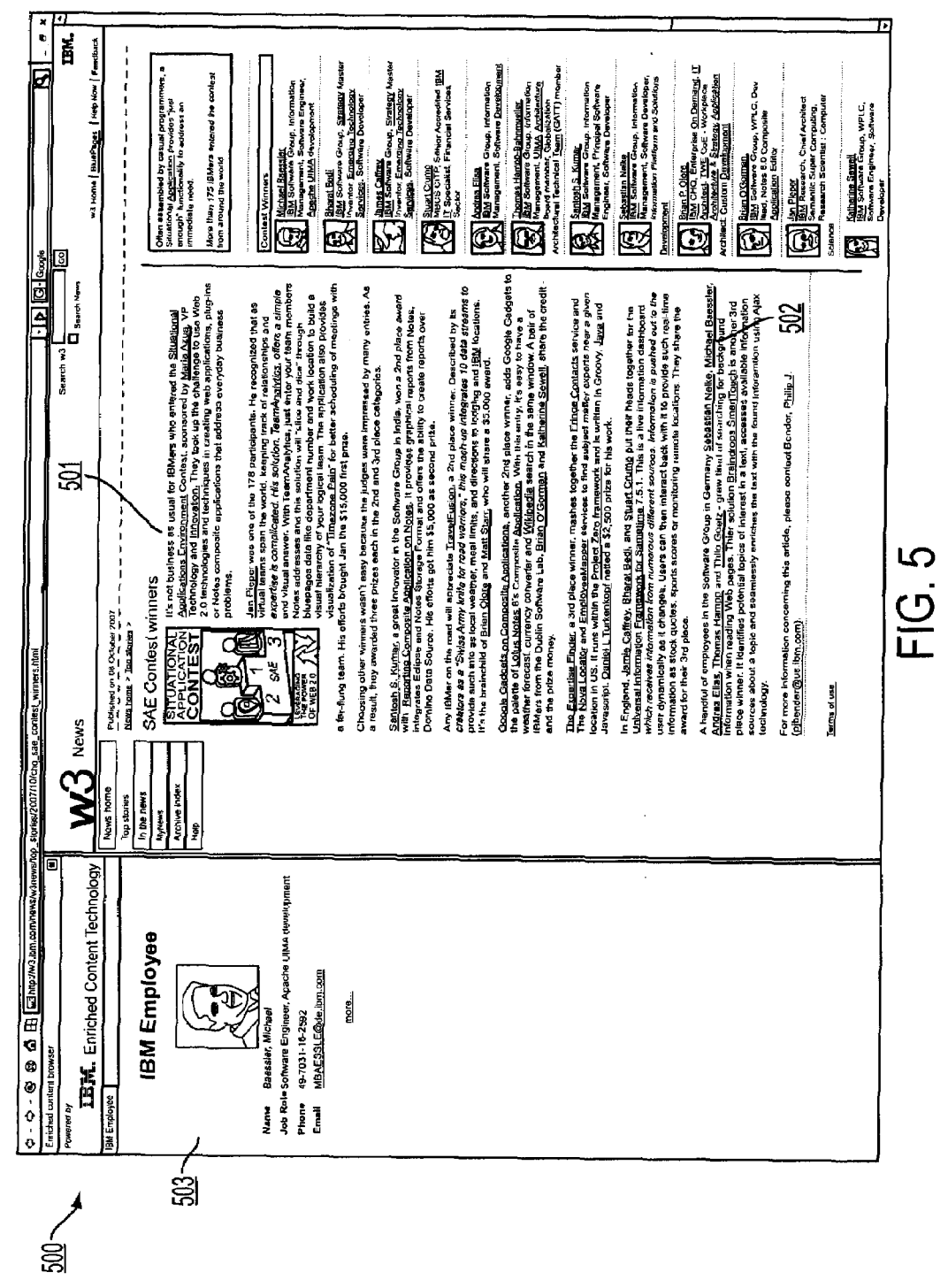

FIG. 5 shows another embodiment of a web browser 500 incorporating ECB; as shown in FIG. 5, term 502 ("Michael Baessler") in web page 501 is tagged by an analysis service, and employee information regarding term 502 is displayed in action panel 503.

FIG. 6 shows yet another embodiment of a web browser 600 incorporating ECB. Terms 601 (employee information for "Sebastian Nelke") is tagged by an analysis service, and the associated action service offers the user the option to add the highlighted term to Lotus Notes contacts, or create a new business partner in SAP CRM, in action panel 602.

Figure 7:
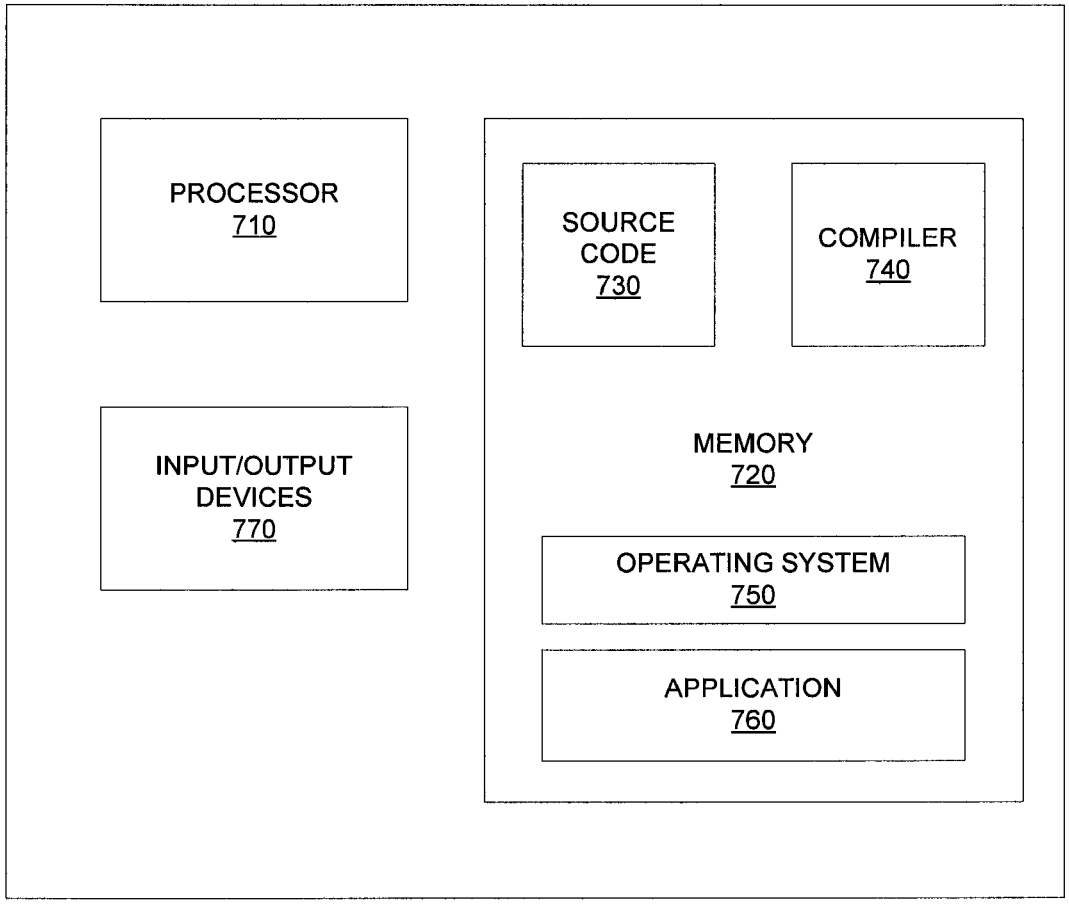
FIG. 7 illustrates an embodiment of a computer that may be used in conjunction with systems and methods for enhanced content browsing.

FIG. 7 illustrates an example of a computer 700 having capabilities, which may be utilized by exemplary embodiments of a method for ECB as embodied in software. Various operations discussed above may utilize the capabilities of the computer 700. One or more of the capabilities of the computer 700 may be incorporated in any element, module, application, and/or component discussed herein.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 760 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. The computer readable medium can be, for example but not limited to, an electronic, magnetic, optical, electromagnetic, or semiconductor system, apparatus, or device.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments of ECB include enhancement of the web browsing experience by the display of additional information, the types of displayed information being configurable by the user, without slowing page load times. ECB may work in any web browser with any web content, with no special client required, providing an open, configurable architecture for tagging and action services.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:
1. A computer-implemented method for enhanced content browsing, the method comprising:
    loading, by a processor, a web page in a web browser, the web page comprising text;

detecting entities of a first specified type in the web page by a first analysis service based on calling the first analysis service by a browser plugin of the web browser, wherein detecting the entities of the first specified type comprises text analysis of the text of the web page by the first analysis service to recognize terms in the text of the web page corresponding to the first specified type, and wherein the first analysis service is called by the web browser asynchronously from the loading of the web page in the web browser;

detecting entities of a second specified type in the web page by a second analysis service based on calling the second analysis service by the browser plugin of the web browser, wherein the entities of the second specified type are of a type that is distinct from the entities of the first specified type, wherein detecting the entities of the second specified type comprises text analysis of the text of the web page by the second analysis service to recognize terms in the text of the web page corresponding to the second specified type, and wherein the second analysis service is called by the web browser asynchronously from the loading of the web page in the web browser;

detecting entities of a third specified type in the web page by a third analysis service based on calling the third analysis service by the browser plugin of the web browser, wherein the entities of the third specified type are of a type that is distinct from the entities of the first specified type and the second specified type, wherein detecting the entities of the third specified type comprises text analysis of the text of the web page by the third analysis service to recognize terms in the text of the web page corresponding to the third specified type, and wherein the third analysis service is called by the web browser asynchronously from the loading of the web page in the web browser;

tagging the detected entities of the first specified type, the second specified type, and the third specified type in the web page, wherein the tagged detected entities are highlighted and wherein each of the highlighted entities do not comprise links;

wherein the first specified type, the second specified type, and the third specified type each comprise a name of a person, a geographical location, an amount of a currency, an abbreviation, or a title of an instance of media, wherein the associated action service for a specified type comprising the name of a person comprises fetching detailed information for the person from the company database, wherein the associated action service for a specified type comprising a geographical location comprises displaying a map of an address, wherein the associated action service for a specified type comprising an amount of a currency comprises fetching a conversion rate to another currency, and wherein the associated action service for a specified type comprising an abbreviation comprises showing an expanded form of the abbreviation; and wherein the associated action service for a specified type comprising a title of an instance of media comprises adding the instance of media to a shopping cart or completing a purchase of the instance of media;

wherein the action services, analysis services, and associations between the action services and analysis services are configurable by a user;

calling by the browser plugin of the web browser a first action service associated with the first analysis service based on detected entity of the first specified type is being activated by the user mousing over the detected entity of the first specified type;

displaying a result of the first action service in the user interface by the browser plugin of the web browser;

calling by the browser plugin of the web browser a second action service associated with the second analysis service based on a detected entity of the second specified type is being activated by the user mousing over the detected entity of the second specified type;

displaying a result of the second action service in the user interface by the browser plugin of the web browser;

calling by the browser plugin of the web browser a third action service, the third action service being distinct from the first action service, based on the detected entity of the first specified type being activated by the user mousing over the detected entity of the third specified type; and displaying a result of the third action service in the user interface by the browser plugin of the web browser.

2. The method of claim 1, wherein the first specified type and the second specified type are configurable by a user.

3. The method of claim 1, wherein activating a detected entity comprises a mouse-over of the entity.

4. The method of claim 1, wherein the first action service is configured by a user to be associated with the first analysis service, and wherein the second action service is configured by the user to be associated with the second analysis service.

5. The method of claim 1, wherein a target of the first action service and a target of the second action service are configurable by a user.

6. The method of claim 1, wherein calling the first action service comprises sending metadata associated with the detected entity of the first specified type to the first action service by the analysis service.

7. The method of claim 6, wherein the detected entity of the first specified type comprises a city name, and the metadata comprises a zip code associated with the city name.

8. The method of claim 1, wherein the detected entities of the first specified type are highlighted in a first color that is associated with the first analysis service, the detected entities of the second specified type are highlighted in a second color that is associated with the second analysis service, the second color being distinct from the first color, and the detected entities of the third specified type are highlighted in a third color that is associated with the third analysis service, the third color being distinct from the first and second colors.

9. A computer program product comprising a non-transitory computer readable medium containing computer code that, when executed by a computer, implements a method for enhanced content browsing, wherein the method comprises:

loading, by a processor, a web page in a web browser, the web page comprising text;

detecting entities of a first specified type in the web page by a first analysis service based on calling the first analysis service by a browser plugin of the web browser, wherein detecting the entities of the first specified type comprises text analysis of the text of the web page by the first analysis service to recognize terms in the text of the web page corresponding to the first specified type, and wherein the first analysis service is called by the web browser asynchronously from the loading of the web page in the web browser;

detecting entities of a second specified type in the web page by a second analysis service based on calling the second analysis service by the browser plugin of the web browser, wherein the entities of the second specified type are of a type that is distinct from the entities of the first specified type, wherein detecting the entities of the second specified type comprises text analysis of the text of the web page by the second analysis service to recognize terms in the text of the web page corresponding to the second specified type, and wherein the second analysis service is called by the web browser asynchronously from the loading of the web page in the web browser;

detecting entities of a third specified type in the web page by a third analysis service based on calling the third analysis service by the browser plugin of the web browser, wherein the entities of the third specified type are of a type that is distinct from the entities of the first specified type and the second specified type, wherein detecting the entities of the third specified type comprises text analysis of the text of the web page by the third analysis service to recognize terms in the text of the web page corresponding to the third specified type, and wherein the third analysis service is called by the web browser asynchronously from the loading of the web page in the web browser;

tagging the detected entities of the first specified type, the second specified type, and the third specified type in the web page, wherein the tagged detected entities are highlighted and wherein each of the highlighted entities do not comprise links;

wherein the first specified type, the second specified type, and the third specified type each comprise a name of a person, a geographical location, an amount of a currency, an abbreviation, or a title of an instance of media, wherein the associated action service for a specified type comprising the name of a person comprises fetching detailed information for the person from the company database, wherein the associated action service for a specified type comprising a geographical location comprises displaying a map of an address, wherein the associated action service for a specified type comprising an amount of a currency comprises fetching a conversion rate to another currency, and wherein the associated action service for a specified type comprising an abbreviation comprises showing an expanded form of the abbreviation; and wherein the associated action service for a specified type comprising a title of an instance of media comprises adding the instance of media to a shopping cart or completing a purchase of the instance of media;

wherein the action services, analysis services, and associations between the action services and analysis services are configurable by a user;

calling by the browser plugin of the web browser a first action service associated with the first analysis service based on detected entity of the first specified type is being activated by the user mousing over the detected entity of the first specified type;

displaying a result of the first action service in the user interface by the browser plugin of the web browser;

calling by the browser plugin of the web browser a second action service associated with the second analysis service based on a detected entity of the second specified type is being activated by the user mousing over the detected entity of the second specified type;

displaying a result of the second action service in the user interface by the browser plugin of the web browser;

calling by the browser plugin of the web browser a third action service, the third action service being distinct from the first action service, based on the detected entity of the first specified type being activated by the user mousing over the detected entity of the third specified type; and displaying a result of the third action service in the user interface by the browser plugin of the web browser.

10. The computer program product of claim 9, wherein the first specified type and the second specified type are configurable by a user.

11. The computer program product of claim 9, wherein a target of the first action service and a target of the second action service are configurable by a user.

12. The computer program product of claim 9, wherein the detected entity is activated by a mouse-over of the detected entity.

13. The computer program product of claim 9, further comprising an action panel in the user interface, the action panel configured to display a result of the first or second action services.

14. The computer program product of claim 9, wherein calling the first action service comprises sending metadata associated with the detected entity of the first specified type to the first action service by the analysis service.

15. The computer program product of claim 14, wherein the detected entity of the first specified type comprises a city name, and the metadata comprises a zip code associated with the city name.

16. The computer program product of claim 9, wherein the detected entities of the first specified type are highlighted in a first color that is associated with the first analysis service, the detected entities of the second specified type are highlighted in a second color that is associated with the second analysis service, the second color being distinct from the first color, and the detected entities of the third specified type are highlighted in a third color that is associated with the third analysis service, the third color being distinct from the first and second colors.

17. A computer system for enhanced content browsing, the system comprising:

a processor, the processor configured in communication with a memory to perform a method comprising:

loading, by a processor, a web page in a web browser, the web page comprising text;

detecting entities of a first specified type in the web page by a first analysis service based on calling the first analysis service by a browser plugin of the web browser, wherein detecting the entities of the first specified type comprises text analysis of the text of the web page by the first analysis service to recognize terms in the text of the web page corresponding to the first specified type, and wherein the first analysis service is called by the web browser asynchronously from the loading of the web page in the web browser;

detecting entities of a second specified type in the web page by a second analysis service based on calling the second analysis service by the browser plugin of the web browser, wherein the entities of the second specified type are of a type that is distinct from the entities of the first specified type, wherein detecting the entities of the second specified type comprises text analysis of the text of the web page by the second analysis service to recognize terms in the text of the web page corresponding to the second specified type, and wherein the second analysis service is called by the web browser asynchronously from the loading of the web page in the web browser;

detecting entities of a third specified type in the web page by a third analysis service based on calling the third analysis service by the browser plugin of the web browser, wherein the entities of the third specified type are of a type that is distinct from the entities of the first specified type and the second specified type, wherein detecting the entities of the third specified type comprises text analysis of the text of the web page by the third analysis service to recognize terms in the text of the web page corresponding to the third specified type, and wherein the third analysis service is called by the web browser asynchronously from the loading of the web page in the web browser;

tagging the detected entities of the first specified type, the second specified type, and the third specified type in the web page, wherein the tagged detected entities are highlighted and wherein each of the highlighted entities do not comprise links;

wherein the first specified type, the second specified type, and the third specified type each comprise a name of a person, a geographical location, an amount of a currency, an abbreviation, or a title of an instance of media, wherein the associated action service for a specified type comprising the name of a person comprises fetching detailed information for the person from the company database, wherein the associated action service for a specified type comprising a geographical location comprises displaying a map of an address, wherein the associated action service for a specified type comprising an amount of a currency comprises fetching a conversion rate to another currency, and wherein the associated action service for a specified type comprising an abbreviation comprises showing an expanded form of the abbreviation; and wherein the associated action service for a specified type comprising a title of an instance of media comprises adding the instance of media to a shopping cart or completing a purchase of the instance of media;

wherein the action services, analysis services, and associations between the action services and analysis services are configurable by a user;

calling by the browser plugin of the web browser a first action service associated with the first analysis service based on detected entity of the first specified type is being activated by the user mousing over the detected entity of the first specified type;

displaying a result of the first action service in the user interface by the browser plugin of the web browser;

calling by the browser plugin of the web browser a second action service associated with the second analysis service based on a detected entity of the second specified type is being activated by the user mousing over the detected entity of the second specified type;

displaying a result of the second action service in the user interface by the browser plugin of the web browser;

calling by the browser plugin of the web browser a third action service, the third action service being distinct from the first action service, based on the detected entity of the first specified type being activated by the user mousing over the detected entity of the third specified type; and displaying a result of the third action service in the user interface by the browser plugin of the web browser.

18. The system of claim 17, wherein the first specified type and the second specified type are configurable by a user.

19. The system of claim 17, wherein activating a detected entity comprises a mouse-over of the entity.

20. The system of claim 17, wherein the first action service is configured by a user to be associated with the first analysis service, and wherein the second action service is configured by the user to be associated with the second analysis service.

21. The system of claim 17, wherein a target of the first action service and a target of the second action service are configurable by a user.

22. The system of claim 17, wherein the detected entities of the first specified type are highlighted in a first color that is associated with the first analysis service, the detected entities of the second specified type are highlighted in a second color that is associated with the second analysis service, the second color being distinct from the first color, and the detected entities of the third specified type are highlighted in a third color that is associated with the third analysis service, the third color being distinct from the first and second colors.

* * * * *